(12) United States Patent
Sun et al.

(10) Patent No.: US 12,199,556 B2
(45) Date of Patent: Jan. 14, 2025

(54) TRACKER TRACKING METHOD AND SYSTEM, PHOTOVOLTAIC APPARATUS AND MEDIUM

(71) Applicant: TRINA SOLAR CO., LTD., Jiangsu (CN)

(72) Inventors: Kai Sun, Jiangsu (CN); Guokun Huang, Jiangsu (CN); Peng Quan, Jiangsu (CN); Ming Zhao, Jiangsu (CN)

(73) Assignee: TRINA SOLAR CO., LTD., Jiangsu (CN)

( * ) Notice: Subject to any disclaimer, the term of this patent is extended or adjusted under 35 U.S.C. 154(b) by 0 days.

(21) Appl. No.: 18/561,771

(22) PCT Filed: Oct. 21, 2022

(86) PCT No.: PCT/CN2022/126687
§ 371 (c)(1),
(2) Date: Nov. 17, 2023

(87) PCT Pub. No.: WO2023/138132
PCT Pub. Date: Jul. 27, 2023

(65) Prior Publication Data
US 2024/0258961 A1    Aug. 1, 2024

(30) Foreign Application Priority Data

Jan. 21, 2022 (CN) .......................... 202210070932.8

(51) Int. Cl.
| | | |
|---|---|---|
| H02S 20/32 | (2014.01) | |
| G01S 3/786 | (2006.01) | |
| H02S 40/38 | (2014.01) | |

(52) U.S. Cl.
CPC ............ H02S 20/32 (2014.12); G01S 3/7861 (2013.01); H02S 40/38 (2014.12)

(58) Field of Classification Search
CPC .......... H02S 20/32; H02S 40/38; H02S 50/00; H02S 50/10; G01S 3/7861
See application file for complete search history.

(56) References Cited

U.S. PATENT DOCUMENTS

| | | | |
|---|---|---|---|
| 8,895,834 B1 * | 11/2014 | Nachamkin | ........... F24S 30/452 |
| | | | 126/600 |
| 11,522,491 B2 * | 12/2022 | Mouniandy | ............. F24S 50/20 |
| 2010/0309330 A1 | 12/2010 | Beck | |

FOREIGN PATENT DOCUMENTS

| | | |
|---|---|---|
| CN | 107340785 A | 11/2017 |
| CN | 111273703 A | 6/2020 |

(Continued)

OTHER PUBLICATIONS

WIPO, International search report issued on Nov. 28, 2022 for application No. PCT/CN2022/126687.

*Primary Examiner* — Seung C Sohn
(74) *Attorney, Agent, or Firm* — HOUTTEMAN LAW LLC

(57) ABSTRACT

A tracker tracking method and system, a photovoltaic device, and a medium are provided. The tracker tracking method comprises: acquiring irradiation data of respective target photovoltaic modules; acquiring initial tracking angles of the respective get photovoltaic modules, adjusting tracking angles of the target photovoltaic modules and calculating total power generation amounts of the target photovoltaic modules corresponding to different adjustment modes for the tracking angles according to the irradiation data and the initial tracking angles; and determining target adjustment modes for the tracking angles of the target photovoltaic modules based on the total power generation amounts of the target photovoltaic modules.

10 Claims, 9 Drawing Sheets

(56) References Cited

FOREIGN PATENT DOCUMENTS

| CN | 112327999 A | 2/2021 |
| CN | 112947665 A | 6/2021 |
| CN | 113093813 A | 7/2021 |
| CN | 213717907 U | 7/2021 |

* cited by examiner

TRACKER TRACKING METHOD AND SYSTEM, PHOTOVOLTAIC APPARATUS AND MEDIUM

CROSS-REFERENCE TO RELATED APPLICATIONS

The present application is based on International Application No. PCT/CN2022/126687, filed on Oct. 21, 2022, which is based upon and claims priority to Chinese Patent Application No. 202210070932.8, filed on Jan. 21, 2022, and the entire contents thereof are incorporated herein by reference.

TECHNICAL FIELD

Embodiments of the present disclosure relate to the technical field of solar energy, and particularly relate to a tracker tracking method, a tracker tracking system, a photovoltaic apparatus, and a medium.

BACKGROUND

With the rapid development of photovoltaic power generation technology, photovoltaic power generation is widely concerned. The existing photovoltaic modules are generally arranged in an array. Since sun irradiation angle is small in the morning or evening, the photovoltaic modules in a front row may shade the photovoltaic modules in a rear row, thereby influencing the power generation amount of the photovoltaic modules.

SUMMARY

Embodiments of the present disclosure provide a tracker tracking method and system, a photovoltaic apparatus and a medium, which can solve the technical problem that the photovoltaic modules in a front row shade the photovoltaic modules in a rear row, thereby influencing the power generation amount of the photovoltaic modules.

In order to solve the above problem, the present disclosure adopts the following technical solutions:

In a first aspect, an embodiment of the present disclosure provides a tracker tracking method, including:
  acquiring irradiation data of respective target photovoltaic modules;
  acquiring initial tracking angles of the respective target photovoltaic modules;
  according to the irradiation data and the initial tracking angles, adjusting tracking angles of the target photovoltaic modules and calculating total power generation amounts of the target photovoltaic modules corresponding to different adjustment modes for the tracking angles; and
  determining target adjustment modes for the tracking angles of the target photovoltaic modules based on the total power generation amounts of the target photovoltaic modules.

Optionally, the irradiation data includes a shaded area of the photovoltaic module, an incident angle of the photovoltaic module, and a gear of the photovoltaic module being shaded;
  wherein gears of the photovoltaic module are partitioned by regions each having the same loss in power generation amount caused by the shaded area of the target photovoltaic module and based on the type of the target photovoltaic module.

Optionally, the adjusting the tracking angles of the target photovoltaic modules according to the irradiation data and the initial tracking angles includes:
  establishing a micro-shading model for the target photovoltaic modules according to the irradiation data of the target photovoltaic modules, the initial tracking angles of the target photovoltaic modules and the type of the target photovoltaic modules; and
  adjusting the tracking angles of the target photovoltaic modules based on the micro-shading model and according to the adjustment modes corresponding to the respective target photovoltaic modules; wherein the adjustment modes include: a first adjustment mode, a second adjustment mode and a third adjustment mode.

Optionally, the adjusting the tracking angles of the target photovoltaic modules based on the micro-shading model and according to the adjustment modes corresponding to the respective target photovoltaic modules includes:
  in the first adjustment mode of each target photovoltaic module, reducing the tracking angle of the target photovoltaic module based on the micro-shading model, with the shaded area of the target photovoltaic module being zero;
  in the second adjustment mode of each target photovoltaic module, increasing the tracking angle of the target photovoltaic module based on the micro-shading model without raising the gear of the photovoltaic module; and
  in the third adjustment mode of each target photovoltaic module, reducing the tracking angle of the target photovoltaic module and lowering the gear of the photovoltaic module based on the micro-shading model, with the shaded area being greater than zero.

Optionally, calculating the total power generation amounts of the target photovoltaic modules corresponding to different adjustment modes for the tracking angles according to the irradiation data and the initial tracking angles includes:
  calculating, based on the micro-shading model and according to the irradiation data and the initial tracking angles, a first power generation amount of each target photovoltaic module in the first adjustment mode;
  calculating, based on the micro-shading model and according to the irradiation data and the initial tracking angles, a second power generation amount of each target photovoltaic module in the second adjustment mode;
  calculating, based on the micro-shading model and according to the irradiation data and the initial tracking angles, a third power generation amount of each target photovoltaic module in the third adjustment mode;
  calculating total power generation amounts of n target photovoltaic modules based on the first power generation amount, the second power generation amount and the third power generation amount corresponding to the adjustment modes of (n−1) target photovoltaic modules and the power generation amount of a single target photovoltaic module in the first row;
  wherein n is a positive integer greater than or equal to 2; and the adjustment modes of the (n−1) target photovoltaic modules include $3^{(n-1)}$ combinations.

Optionally, the determining the target adjustment modes for the tracking angles of the target photovoltaic modules based on the total power generation amount of the target photovoltaic module includes:

comparing the total power generation amounts of the n target photovoltaic modules to obtain a maximum total power generation amount of the target photovoltaic modules; and determining, based on the maximum total power generation amount of the target photovoltaic modules, the target adjustment modes for the tracking angles of the respective target photovoltaic modules when the total power generation amount of the target photovoltaic modules is the maximum total power generation amount.

Optionally, after determining the target adjustment modes for the tracking angles of the target photovoltaic modules based on the total power generation amounts of the target photovoltaic modules, the method further includes:

adjusting the tracking angles of the target photovoltaic modules based on the target adjustment modes for the tracking angles.

In a second aspect, an embodiment of the present disclosure provides a tracker tracking system, including:

a data acquisition module configured to acquire irradiation data of respective target photovoltaic modules;

an angle acquisition module configured to acquire initial tracking angles of the respective target photovoltaic modules;

a power amount calculation module configured to adjust tracking angles of the target photovoltaic modules and calculate total power generation amounts of the target photovoltaic modules corresponding to different adjustment modes for the tracking angles according to the irradiation data and the initial tracking angles; and an adjustment mode determining module configured to determine target adjustment modes for the tracking angles of the target photovoltaic modules based on the total power generation amounts of the target photovoltaic modules.

In a third aspect, an embodiment of the present disclosure further provides a photovoltaic apparatus, including the tracker tracking system described in the second aspect.

In a fourth aspect, an embodiment of the present disclosure further provides a readable storage medium having instructions stored thereon which, when executed by a processor of a tracker tracking system, enables the tracker tracking system to perform the tracker tracking method according to the first aspect.

According to the technical solution provided in the embodiments of the present disclosure, the irradiation data and the initial tracking angles of the respective target photovoltaic modules are acquired to establish a micro-shading model, the tracking angles of the target photovoltaic modules are adjusted by means of different tracking angle adjustment modes, then the power generation amounts under the respective tracking angle adjustment modes adopted by the respective target photovoltaic modules are calculated, and total power generation amount of the photovoltaic module array under different combinations of tracking angle adjustment modes adopted by the respective target photovoltaic modules are calculated. According to the calculated total power generation amounts of the photovoltaic module array, tracking angle adjustment modes correspondingly adopted by the respective target photovoltaic modules are determined as target adjustment modes for the tracking angles, respectively. Such a tracker tracking method is suitable for target photovoltaic modules with different horizontal elevation differences in complex terrains, so that the total power generation amount of the photovoltaic module array and the power generation benefit are optimized, and the loss in power generation amount is minimized.

BRIEF DESCRIPTION OF DRAWINGS

In order to make the technical solution in the embodiments of the present disclosure clearer, the drawings required in the description of the embodiments of the present disclosure will be briefly described below. Obviously, the drawings described below are merely some embodiments of the present disclosure, and other drawings may be obtained by those of ordinary skill in the art based on the contents in the embodiments of the present disclosure and these drawings without any creative labor.

DETAIL DESCRIPTION OF EMBODIMENTS

Figure 1:
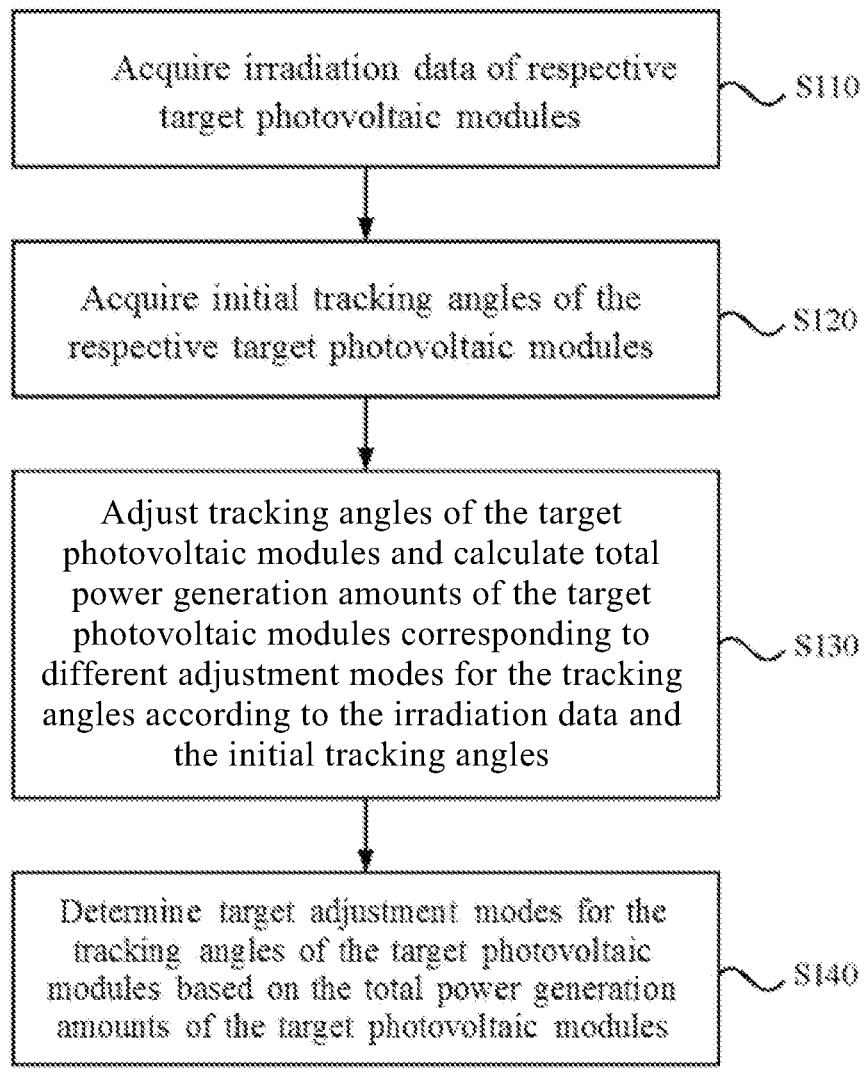
FIG. 1 is a flowchart of a tracker tracking method according to an embodiment of the present disclosure.

The present disclosure will be further described in detail below in conjunction with the drawings and exemplary embodiments. It will be appreciated that the specific embodiments described herein are used merely for the purpose of explaining the present disclosure instead of limiting the present disclosure. It should be further noted that, for the convenience of description, merely some of the structures associated with the present disclosure, rather than all the structures, are shown in the drawings.

Based on the above-mentioned technical problem, embodiments of the present disclosure propose the following solutions:

An embodiment of the present disclosure provides a tracker tracking method. FIG. 1 is a flowchart of a tracker tracking method according to an embodiment of the present disclosure. This method is suitable for solving the problem of reduced total power generation amount due to light shading or light leakage occurring in photovoltaic modules in the reverse tracking stage. The tracker tracking method includes the following steps.

Figure 2:
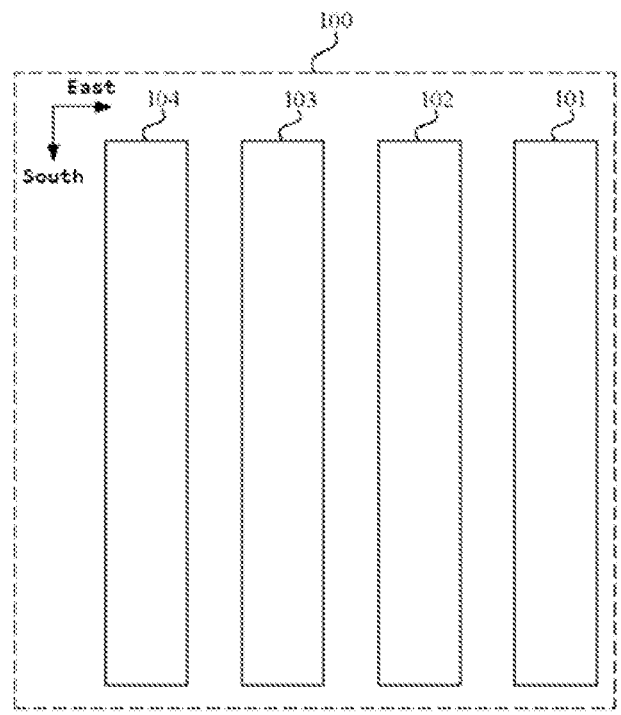
FIG. 2 is a schematic top view of a photovoltaic module array according to an embodiment of the present disclosure.

At S110, acquiring irradiation data of respective target photovoltaic modules. Specifically, FIG. 2 is a schematic top view of a photovoltaic module array according to an embodiment of the present disclosure. As shown in FIG. 2, photovoltaic modules 101 are arranged in an array, and the photovoltaic module array 100 may include multiple rows of photovoltaic modules. For example: the photovoltaic module array 100 may include photovoltaic modules 101, photovoltaic modules 102, photovoltaic modules 103 and photovoltaic modules 104. In one photovoltaic module array 100, the respective rows of photovoltaic modules form one column in the east-west direction; while each photovoltaic module group forms one row in the north-south direction. Two adjacent rows of photovoltaic modules in the photovoltaic module array 100 are arranged in sequence along the east-west direction in terms of geographic location. Each row of photovoltaic modules 101 includes a single photovoltaic module group consisting of a plurality of photovoltaic modules. Therefore, in the same row of the photovoltaic module array 100, photovoltaic modules in a single photovoltaic module group have the same tracking angle. The target photovoltaic module refers to each row of photovoltaic modules in the photovoltaic module array 100. In the reverse tracking stage in the morning, since the sun is located at the east, the photovoltaic modules 101 form the first row, the photovoltaic modules 104 form the fourth row, the photovoltaic modules 101 also form the front row, and the photovoltaic modules 102, the photovoltaic modules 103 and the photovoltaic modules 104 form the rear rows. In contrast, in the reverse tracking stage in the afternoon, since the sun is located at the west, the photovoltaic modules 104 form the first row, the photovoltaic modules 101 form the fourth row, the photovoltaic modules 104 also form the front row, and the photovoltaic modules 103, the photovoltaic modules 102 and the photovoltaic modules 101 forms the rear rows.

In the morning and/or afternoon of each day, in the period when the solar altitude is relatively small, the photovoltaic modules of the front row may obviously shade (block) sunlight from irradiating the photovoltaic modules of the rear row due to fluctuations of the terrain, resulting in relatively high loss in power generation amount of the whole photovoltaic module array. The irradiation data is a parameter relative to the solar rays actually received by a photovoltaic module. The irradiation data may be obtained from a ground meteorological station for measuring horizontal total irradiation data and scattering irradiation data, or from a third-party meteorological service platform in real time based on geographic information according to the local geographic location information and time.

At S120, acquiring initial tracking angles of the respective target photovoltaic modules.

Specifically, the initial tracking angle of each target photovoltaic module is a tracking angle in an initial state before the reverse tracking stage. The initial tracking angles may include tracking angles set when the respective photovoltaic modules are arranged and installed before being adjusted in the reverse tracking process, or tracking angles of the respective target photovoltaic modules adjusted in the last reverse tracking stage. Under the condition that the geographic location information of the arrangement point of the photovoltaic module array is determined, all target photovoltaic modules in the photovoltaic module array have the same initial tracking angle, and the distance between any two adjacent rows of photovoltaic modules in the photovoltaic module array is generally the same. The tracking angle of a target photovoltaic module may be directly obtained by an inclination angle sensor which is installed on a photovoltaic module tracking tracker and connected to a controller.

At S130, adjusting tracking angles of the target photovoltaic modules and calculating total power generation amounts of the target photovoltaic modules corresponding to different adjustment modes for the tracking angles according to the irradiation data and the initial tracking angles.

Specifically, according to the irradiation data and the initial tracking angles, the tracking trackers may adjust the tracking angles of the target photovoltaic modules, and thus reduce the loss in power generation amount of the photovoltaic module array due to light shading or light leakage in the reverse tracking stage. There are many adjustment modes for the tracking angles of the photovoltaic modules (or called tracking angle adjustment modes). In the photovoltaic module array, the power generation amount of each target photovoltaic module after being optimized and adjusted according to each different tracking angle adjustment mode can be calculated for the target photovoltaic module. Then, the total power generation amount of the photovoltaic module array is calculated according to the power generation amount of each target photovoltaic module after being optimized and adjusted.

At S140, determining target adjustment modes for the tracking angles of the target photovoltaic modules based on the total power generation amounts of the target photovoltaic modules.

Specifically, a judgment is performed according to a preset judgment method and the total power generation amount of the photovoltaic module array formed by the target photovoltaic modules, to determine an optimal combination of tracking angle adjustment modes according to the judgment result. The tracking angle adjustment mode adopted by each row of photovoltaic modules is the optimal tracking angle adjustment mode for the corresponding row of photovoltaic modules, and said optimal tracking angle adjustment mode is determined to be the target adjustment mode for the tracking angle of the corresponding target photovoltaic module.

According to the technical solution provided in this embodiment of the present disclosure, the irradiation data and the initial tracking angles of the respective target photovoltaic modules are acquired to establish a micro-shading model, the tracking angles of the target photovoltaic modules are adjusted by means of different tracking angle adjustment modes, then the power generation amounts under the respective tracking angle adjustment modes adopted by the respective target photovoltaic modules are calculated, and total power generation amounts of the photovoltaic module array under different combinations of tracking angle adjustment modes adopted by the respective target photovoltaic modules are calculated. According to the calculated total power generation amounts of the photovoltaic module array, tracking angle adjustment modes correspondingly adopted by the respective target photovoltaic modules are determined as target adjustment modes for the tracking angles, respectively. Such a tracker tracking method is suitable for target photovoltaic modules with different horizontal elevation differences in complex terrains, so that the total power generation amount of the photovoltaic module array and the power generation benefit are optimized, and the loss in power generation amount is minimized.

Optionally, on the basis of the above embodiments, the irradiation data includes a shaded area of the photovoltaic module, an incident angle of the photovoltaic module, and a gear of the photovoltaic module being shaded;

where gears of the photovoltaic module are partitioned by regions each having the same loss in power generation amount caused by the shaded area of the target photovoltaic module and based on the type of the target photovoltaic module.

Specifically, the irradiation data of the target photovoltaic module may be calculated based on a common scattering irradiation model such as Hay, Perez or the like. The shaded area of the photovoltaic module is a shaded area formed on the rear row of two adjacent rows of photovoltaic modules due to the front row shading (shielding) the rear row in the reverse tracking stage. The incident angle of the photovoltaic module is an angle formed between solar rays irradiating on the photovoltaic module and a normal of a surface of the photovoltaic module. The magnitude of the incident angle of the photovoltaic module influences the power generation amount of the photovoltaic module, and the closer the incident angle of the photovoltaic module is to 90°, the larger the power generation amount is.

Figure 3:
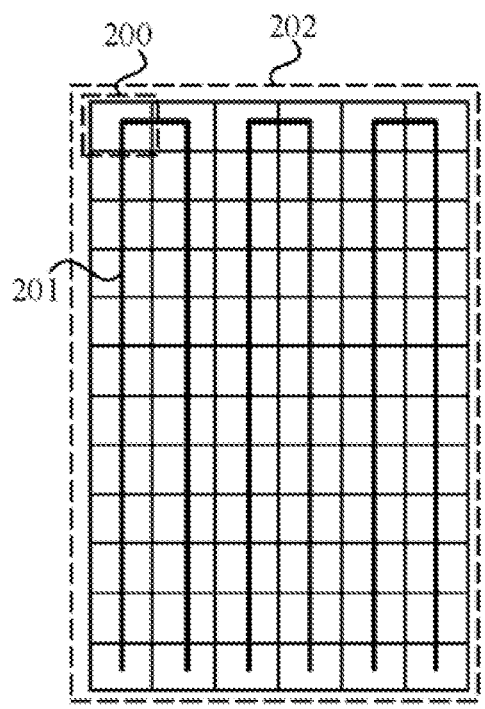
FIG. 3 is a schematic structural diagram of a target photovoltaic module of a monolithic cell type according to an embodiment of the present disclosure.
Figure 4:
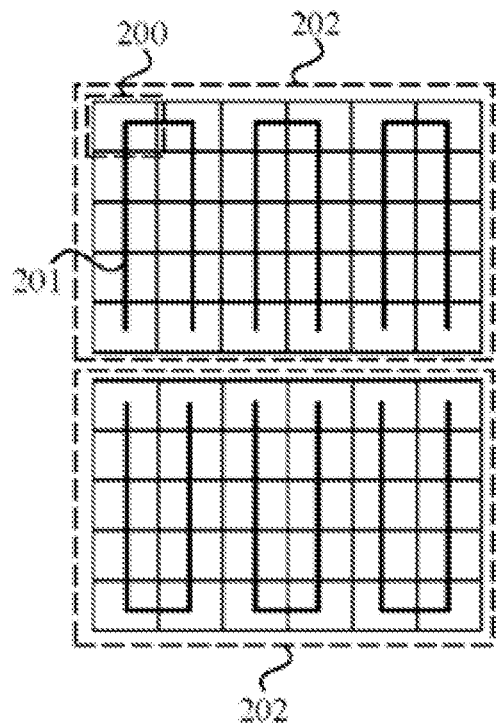
FIG. 4 is a schematic structural diagram of a target photovoltaic module of a half-cell type according to an embodiment of the present disclosure.
Figure 5:
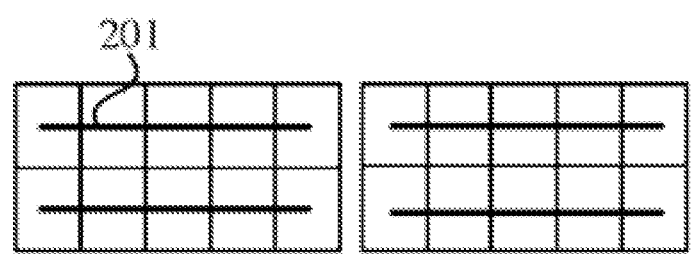
FIG. 5 is a schematic diagram of straight-line shaped string wiring in a half-cell type photovoltaic module arrangement according to an embodiment of the present disclosure.
Figure 6:
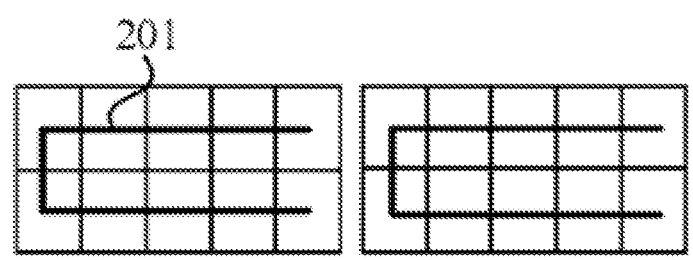
FIG. 6 is a schematic diagram of C-shaped string wiring in a half-cell type photovoltaic module arrangement according to an embodiment of the present disclosure.

The gear of the photovoltaic module being shaded is set according to different types of target photovoltaic modules and the loss in power generation amount. Regions with the same loss in power generation amount caused by the shaded area due to shading (by the front row) are partitioned into the same gear. As an example, FIG. 3 is a schematic structural diagram of a target photovoltaic module of a monolithic cell type (whole cell type) according to an embodiment of the present disclosure; and FIG. 4 is a schematic structural diagram of a target photovoltaic module of a half-cell type according to an embodiment of the present disclosure. As shown in FIGS. 3 and 4, the target photovoltaic modules may be classified as a monolithic cell type, a half-cell type, a three-part cell type (one-third cell type) or the like. Each small rectangle in the photovoltaic module is a photovoltaic string 200. For photovoltaic strings 200 connected in series via a black wire 201, different groups of photovoltaic strings 200 connected in series are connected in parallel to form respective cells 202, and the respective cells 202 are connected in parallel to form an entire photovoltaic module. For example: the target photovoltaic module of the monolithic cell type shown in FIG. 3 includes one cell in total; and the target photovoltaic module of the half-cell type shown in FIG. 4 includes two cells in total. The tracking design and installation method of a photovoltaic module generally includes installing the photovoltaic module vertically. FIG. 5 is a schematic diagram of straight-line shaped string wiring in a half-cell type photovoltaic module arrangement according to an embodiment of the present disclosure; and FIG. 6 is a schematic diagram of C-shaped string wiring in a half-cell type photovoltaic module arrangement according to an embodiment of the present disclosure. For a half-cell type and vertically installed photovoltaic module, the photovoltaic strings may be connected via straight-line shaped wiring and/or C-shaped wiring. As shown in FIG. 5, the black wire 201 is of a straight-line type; and as shown in FIG. 6, the black wire 201 is of a C-shaped type. This embodiment takes the target photovoltaic module with photovoltaic strings connected via C-shaped wiring as an example for explanation.

For different types of photovoltaic modules connected via C-shaped wiring, the gears are also partitioned (divided differently. When shading occurs in the reverse tracking stage, the power generation amounts of a group of photovoltaic strings connected in series with the shaded photovoltaic string(s) will be influenced. Therefore, the loss in power generation amount caused by the shading shadow is regarded as the same for a group of photovoltaic strings connected in series regardless of the size of the shaded area. Therefore, a region on the target photovoltaic module containing a complete series of connected photovoltaic modules is defined as one gear. As an example, for a monolithic cell type photovoltaic module, the entire photovoltaic module is one gear, and thereby the target photovoltaic module may include two gears; while for a half-cell type photovoltaic module, a half of the half-cell is a gear, and thereby the target photovoltaic module may include four gears.

Figure 7:
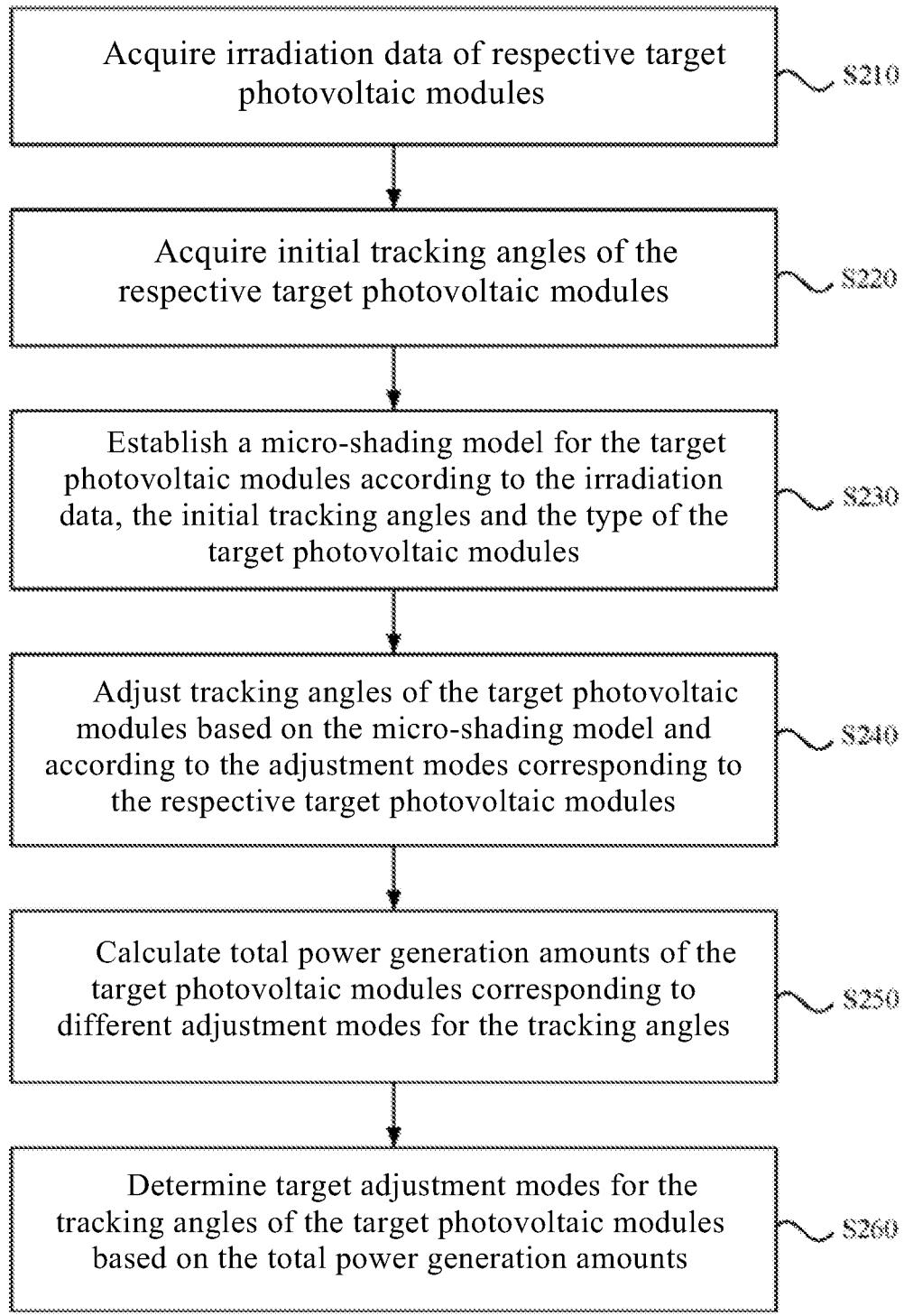
FIG. 7 is a flowchart of another tracker tracking method according to an embodiment of the present disclosure.

Optionally, FIG. 7 is a flowchart of another tracker tracking method according to an embodiment of the present disclosure. On the basis of the above embodiments, referring to FIG. 7, the tracker tracking method includes the following steps S210 to S230.

At S210, acquiring irradiation data of respective target photovoltaic modules.

At S220, acquiring initial tracking angles of the respective target photovoltaic modules.

At S230, establishing a micro-shading model for the target photovoltaic modules according to the irradiation data of the respective target photovoltaic modules, the initial tracking angles of the respective target photovoltaic modules and the type of the target photovoltaic modules.

Specifically, the micro-shading model for the target photovoltaic modules may be established according to the irradiation data and the initial tracking angles of the respective target photovoltaic modules, the type of the target photovoltaic modules, and other module characteristics. Under the condition that the type of the target photovoltaic modules is determined, the controller may calculate and compare, after receiving the irradiation data and the initial tracking angles and based on the micro-shading model, ideal power generation amount data of each target photovoltaic module when the target photovoltaic module receives solar rays at a current tracking angle without being shaded and actual power generation amount data of the respective photovoltaic module strings in the target photovoltaic module. If the actual power generation amount data is equal to the ideal power generation amount data, no light shading or light leakage occurs on the photovoltaic module array, and the tracking angle of the tracking tracker does not need to be adjusted. If the actual power generation amount data is smaller than the ideal power generation amount data, the reverse tracking stage begins at the current moment, and light shading or light leakage occurs on the photovoltaic module array, resulting in loss in power generation amount of the photovoltaic module, and adjustment to the tracking angle of the tracking tracker is required.

At S240, adjusting the tracking angles of the target photovoltaic modules based on the micro-shading model and according to the adjustment modes corresponding to the respective target photovoltaic modules. The adjustment modes include: a first adjustment mode, a second adjustment mode and a third adjustment mode.

Figure 8:
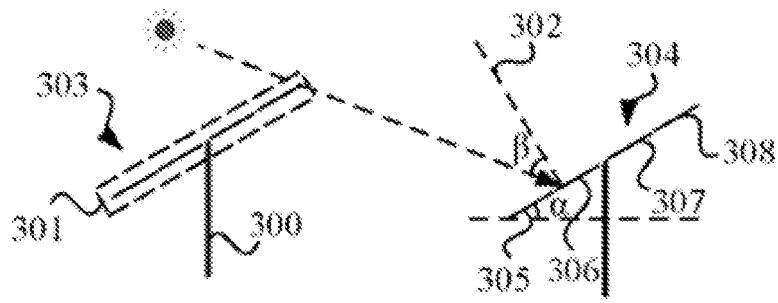
FIG. 8 is a schematic diagram of a scene in which shading occurs on a target photovoltaic module according to an embodiment of the present disclosure in a reverse tracking stage.

Specifically, FIG. 8 is a schematic diagram of a scene in which shading occurs on a target photovoltaic module according to an embodiment of the present disclosure in a reverse tracking stage. As shown in FIG. 8, the target photovoltaic module includes a tracker 300 and a photovoltaic module 301. An angle between the photovoltaic module 301 and the horizontal plane is tracking angle α of the tracking tracker, and an angle between the incident solar rays and a surface normal of the photovoltaic module is incident angle β of the photovoltaic module. As an example, in the case where the geographic location information of the arrangement location of the photovoltaic module array and the solar altitude data are determined, the initial tracking angle of the target photovoltaic module is fixed. For example: the tracking angle α may be 32°. When the incident angle β of the photovoltaic modules is smaller than a certain preset value and the actual power generation amount of the photovoltaic modules is smaller than the ideal power generation amount data, the controller controls the tracking tracker to enter the reverse tracking stage, and optimizes the total power generation amount of the photovoltaic module array by adjusting the tracking angle α of the tracking tracker. The photovoltaic module 301 may include four gears, namely a first gear 305, a second gear 306, a third gear 307 and a fourth gear 308. With the gears sequentially raised from the first gear 305 to the fourth gear 308, the area within which the incident solar rays are shaded is enlarged, resulting in gradually increasing loss in power generation amount of the target photovoltaic module. Due to different of horizontal elevations of two adjacent rows of target photovoltaic modules, a front row target photovoltaic module 303 seriously shade a rear row target photovoltaic module 304, and the shading shadow covers the whole area of the first gear 305 and partial area of the second gear 306 of the photovoltaic module 301, so that the loss in power generation amount of the photovoltaic module array is increased. Therefore, the tracking angle of the rear row target photovoltaic module 304 needs to be adjusted. The adjustment modes for the tracking angles of the target photovoltaic modules may include a first adjustment mode, a second adjustment mode and a third adjustment mode.

Optionally, the adjusting the tracking angles of the target photovoltaic modules based on the micro-shading model and according to the adjustment modes corresponding to the respective target photovoltaic modules includes:
- in the first adjustment mode of each target photovoltaic module, reducing the tracking angle of the target photovoltaic module based on the micro-shading model, with the shaded area of the target photovoltaic module being zero;
- in the second adjustment mode of each target photovoltaic module, increasing the tracking angle of the target photovoltaic module based on the micro-shading model without raising (upshifting) the gear of the photovoltaic module; and
- in the third adjustment mode of each target photovoltaic module, reducing the tracking angle of the target photovoltaic module and lowering the gear of the photovoltaic module based on the micro-shading model, with the shaded area being greater than zero.

Figure 9:
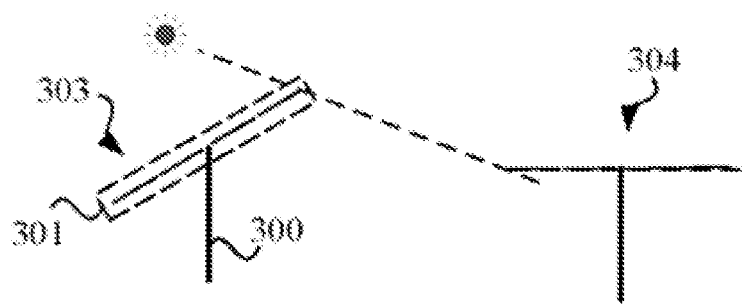
FIG. 9 is a schematic diagram of adjusting the tracking angle of each target photovoltaic module in a first adjustment mode according to an embodiment of the present disclosure.
Figure 10:
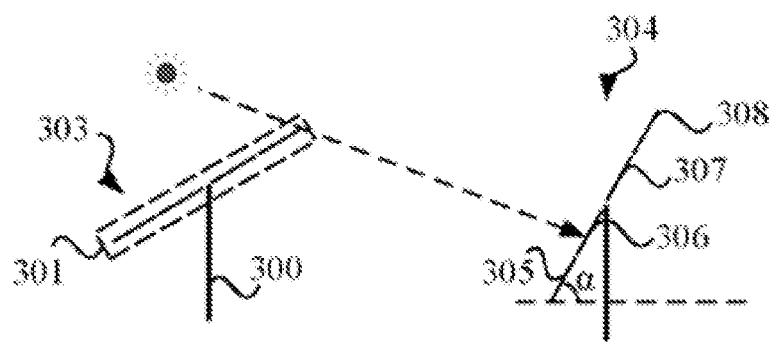
FIG. 10 is a schematic diagram of adjusting the tracking angle of each target photovoltaic module in a second adjustment mode according to an embodiment of the present disclosure.
Figure 11:
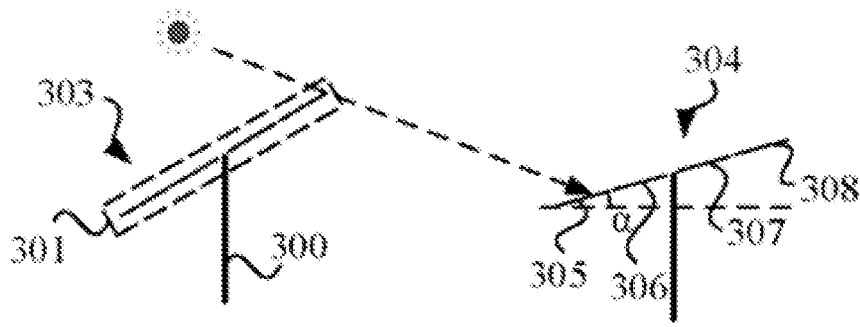
FIG. 11 is a schematic diagram of adjusting the tracking angle of each target photovoltaic module in a third adjustment mode according to an embodiment of the present disclosure.

Specifically, FIG. 9 is a schematic diagram of adjusting the tracking angle of each target photovoltaic module in a first adjustment mode according to an embodiment of the present disclosure; FIG. 10 is a schematic diagram of adjusting the tracking angle of each target photovoltaic module in a second adjustment mode according to an embodiment of the present disclosure; and FIG. 11 is a schematic diagram of adjusting the tracking angle of each target photovoltaic module in a third adjustment mode according to an embodiment of the present disclosure. As shown in FIG. 9, when the tracking angle is adjusted in the first adjustment mode for the target photovoltaic module, the tracking angle α of the rear row target photovoltaic module 304 may be reduced, so that the front row target photovoltaic module 303 does not shade the rear row target photovoltaic module 304, i.e., the shaded area is zero, and the loss in power generation amount of the rear row target photovoltaic module 304 is 0. For example: the tracking angle α of the rear row target photovoltaic module 304 may be reduced to 0°.

As shown in FIG. 10, when the tracking angle is adjusted in the second adjustment mode for the target photovoltaic module, the tracking angle α of the rear row target photovoltaic module 304 may be increased without raising the gear of the target photovoltaic module, so that the gear of the target photovoltaic module remains at the gear before adjusting the tracking angle α, and the tracking angle α of the tracking tracker is adjusted to the maximum angle that does not cause the gear to be raised, thereby ensuring that the maximum power generation amount is reached under the condition that the target photovoltaic module satisfies the requirement of adjustment. For example: the tracking angle α of the tracking tracker may be adjusted to 60°, and the shading shadow still covers the whole area of the first gear 305 and partial area of the second gear 306 of the photovoltaic module 301. Under the condition that the gear of the shading shadow remains unchanged, the loss in power generation amount of the target photovoltaic module is the same (i.e., unchanged), while since the tracking angle of the tracking tracker is increased to 60°, the power generation amount of the target photovoltaic module is increased. Therefore, with the tracking angle adjusted in the second adjustment mode, the power generation amount of the target photovoltaic module is increased in view of the overall effect.

As shown in FIG. 11, when the tracking angle is adjusted in the third adjustment mode for the target photovoltaic module, the tracking angle α of the rear row target photovoltaic module 304 may be reduced, thereby the gear of the photovoltaic module is lowered while a certain shaded area is kept. The tracking angle α of the tracking tracker is adjusted to a critical maximum angle satisfying that the gear is lowered by one, thereby ensuring that the maximum power generation amount is reached under the condition that the rear row target photovoltaic module 304 satisfies certain conditions. For example: the tracking angle α of the tracker may be adjusted to 28°, and an coverage area of the shading shadow on the rear row target photovoltaic module 304 is reduced from covering the whole area of the first gear 305 and partial area of the second gear 306 to merely covering partial area of the first gear 305. That is, the shading shadow is downshifted from the second gear 306 to the first gear 305. By adjusting the tracking angle in the third adjustment mode, although the tracking angle α of the rear row target photovoltaic module 304 is reduced and thus the power generation amount of the rear row target photovoltaic module 304 is reduced, the loss in power generation amount of the rear row target photovoltaic module 304 is also reduced by lowering the gear (downshifting). Therefore, achieving the effect of increasing the power generation amount of the target photovoltaic module in view of the overall effect.

For different types of modules, the power generation amount of the target photovoltaic module varies after the tracking angle of the tracking tracker is adjusted in the first adjustment mode, the second adjustment mode and the third adjustment mode. As an example, as shown in FIG. 8, taking Tongchuan area of China as an example, at a certain moment on a sunny day in summer, the tracking angle of the tracking tracker of the target photovoltaic module is 32°, the horizontal total irradiation is 364 W/m$^2$, and the horizontal scattering irradiation is 82 W/m$^2$. The irradiation data will not change greatly in a single data acquisition period, thus in a future period, the irradiation represents average irradiation in one period, and can be used for calculating and predicting the power generation amount of the target photovoltaic module in the period. The data acquisition period of the irradiation data may be 1 minute, which is not limited herein. Due to the horizontal terrain elevation differences, in a reverse tracking stage in the morning and/or at afternoon, when a front row target photovoltaic module shades a rear row target photovoltaic module, the power generation amount is also changed after different types of photovoltaic modules are optimized and adjusted in different tracking angle adjustment mode. Table 1 is a table of variations in power generation amount of different types of photovoltaic modules after being optimized in each tracking angle adjustment mode. The power generation amount adjusted in each adjustment mode may be obtained by calculation according to a sky scattering irradiation model and a photovoltaic module electrical model. The sky scattering irradiation model is a model established based on solar-terrestrial relationship data in geographic information and earth atmosphere data for calculating irradiation composition and distribution data of a target photovoltaic module that receives solar irradiation. The sky scattering irradiation model may include a Hay model and a Preze model. The photovoltaic module electrical model is a model for calculating the power generation amount of a target photovoltaic module in a four-parameter method based on relevant parameters of the characteristics of the target photovoltaic module. As an example, the relevant parameters of the characteristics of the target photovoltaic module may include a module series resistance, a diode reverse saturation current, a photo-generated current, and/or a diode ideality factor.

As can be seen from table 1, in the case where the photovoltaic module is a monolithic type module, if the module adopts C-shaped string wiring, the loss in power generation amount is 73% before optimization and adjustment, 54% after being optimized in the first adjustment mode, 37.5% after being optimized in the second adjustment mode, and 54% after being optimized in the third adjustment mode; if the module adopts straight-line shaped string wiring, the loss in power generation amount is 50% before optimization and adjustment, 54% after being optimized in the first adjustment mode, 36% after being optimized in the second adjustment mode, and 54% after being optimized in the third adjustment mode. Therefore, for the monolithic type photovoltaic module, an optimal power generation amount of the target photovoltaic module can be reached by adopting the second adjustment mode. In the case where the photovoltaic module is of a half-cell type, if the module adopts C-shaped string wiring, the loss in power generation amount is 73% before optimization and adjustment, 54% after being optimized in the first adjustment mode, 37.5% after being optimized in the second adjustment mode, and 46.5% after being optimized in the third adjustment mode; if the module adopts straight-line shaped string wiring, the loss in power generation amount is 50% before optimization and adjustment, 54% after being optimized in the first adjustment mode, 36% after being optimized in the second adjustment mode, and 25.8% after being optimized in the third adjustment mode. Therefore, for the half-cell type photovoltaic module, if the module adopts C-shaped string wiring, the second adjustment mode is adopted for optimization; and if the module adopts straight-line shaped string wiring, the third adjustment mode is adopted for optimization. Both can lead to an optimal power generation amount of the target photovoltaic module.

Different target photovoltaic modules at different positions in the photovoltaic module array or with different horizontal elevation differences may adopt different adjustment modes for the tracking angles, so that an optimal total power generation amount of the photovoltaic module array can be reached.

TABLE 1

Variations in power generation amount of different types of photovoltaic modules before and after the tracking angle adjustment

| Type | Optimization mode | Power generation amount without shading | C-shaped wiring Before optimization | C-shaped wiring After optimization | Straight-line shaped string wiring Before optimization | Straight-line shaped string wiring After optimization |
|---|---|---|---|---|---|---|
| Monolithic cell module | Conventional | 100% | −73% | \ | −50% | \ |
| | First adjustment mode | | | −54% | | −54% |
| | Second adjustment mode | | | −37.5% | | −36% |
| | Third adjustment mode | | | −54% | | −54% |
| Half-cell module | Conventional | | −73% | \ | −50% | \ |
| | First adjustment mode | | | −54% | | −54% |

TABLE 1-continued

Variations in power generation amount of different types of photovoltaic modules before and after the tracking angle adjustment

| Type | Optimization mode | Power generation amount without shading | C-shaped wiring Before optimization | C-shaped wiring After optimization | Straight-line shaped string wiring Before optimization | Straight-line shaped string wiring After optimization |
|---|---|---|---|---|---|---|
| | Second adjustment mode | | | −37.5% | | −36% |
| | Third adjustment mode | | | −46.5% | | −25.8% |

At S250, calculating total power generation amounts of the target photovoltaic modules corresponding to different adjustment modes for the tracking angles.

At S260, determining target adjustment modes for the tracking angles of the target photovoltaic modules based on the total power generation amounts of the target photovoltaic modules.

Figure 12:
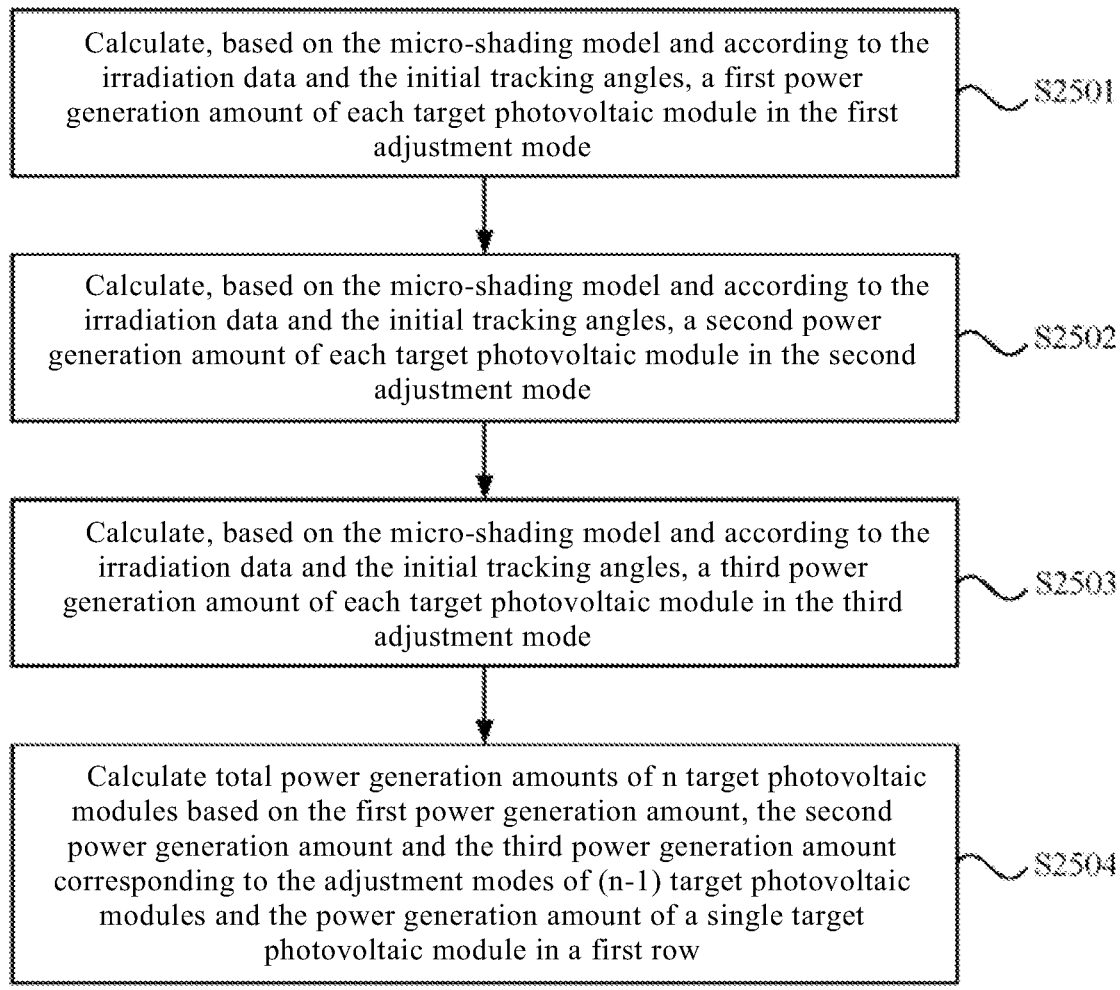
FIG. 12 is a flowchart of specific implementation of step S250 in the another tracker tracking method according to an embodiment of the present disclosure.

Optionally, FIG. 12 is a flowchart of specific implementation of step S250 in yet another tracker tracking method according to an embodiment of the present disclosure. As shown in FIG. 12, on the basis of the above embodiments, the operation of calculating the total power generation amounts of the target photovoltaic modules corresponding to different adjustment modes for the tracking angles according to the irradiation data and the initial tracking angles includes the following steps S2501 to S2504.

At S2501, calculating, based on the micro-shading model and according to the irradiation data and the initial tracking angles, a first power generation amount of each target photovoltaic module in the first adjustment mode.

Specifically, according to the irradiation data and the initial tracking angles, a first power generation amount of each photovoltaic module obtained when the tracking angle of the target photovoltaic module is adjusted in the first adjustment mode may be calculated based on the micro-shading model.

At S2502, calculating, based on the micro-shading model and according to the irradiation data and the initial tracking angles, a second power generation amount of each target photovoltaic module in the second adjustment mode.

Specifically, according to the irradiation data and the initial tracking angles, a second power generation amount of each photovoltaic module obtained when the tracking angle of the target photovoltaic module is adjusted in the second adjustment mode may be calculated based on the micro-shading model.

At S2503, calculating, based on the micro-shading model and according to the irradiation data and the initial tracking angles, a third power generation amount of each target photovoltaic module in the third adjustment mode.

Specifically, according to the irradiation data and the initial tracking angles, a third power generation amount of each photovoltaic module obtained when the tracking angle of the target photovoltaic module is adjusted in the third adjustment mode may be calculated based on the micro-shading model.

At S2504, calculating total power generation amounts of n target photovoltaic modules based on the first power generation amount, the second power generation amount and the third power generation amount corresponding to the adjustment modes of (n−1) target photovoltaic modules and the power generation amount of a single target photovoltaic module in the first row;

where n is a positive integer greater than or equal to 2; and the adjustment modes of the (n−1) target photovoltaic modules include $3^{(n-1)}$ combinations.

Specifically, in a photovoltaic module array composed of n target photovoltaic modules, where n is a positive integer greater than or equal to 2, the photovoltaic module array includes at least two rows, and the number of target photovoltaic modules in the photovoltaic module array is not limited in any way herein. Since the first row is arranged directly toward the sun and no shading occurs thereon, the power generation amount of the first row target photovoltaic module (first target photovoltaic module) is an ideal power generation amount under the current situation, and from the second row target photovoltaic module, the power generation amounts corresponding to different adjustment modes are calculated.

It should be noted that for a photovoltaic module array having n target photovoltaic modules, there are (n−1) target photovoltaic modules in total that need to be optimized and adjusted from the corresponding first row rearward. On the basis of the micro-shading model, the first adjustment mode, the second adjustment mode and the third adjustment mode may be respectively adopted to adjust the tracking angle for each target photovoltaic module, so as to obtain a first power generation amount, a second power generation amount and a third power generation amount of each target photovoltaic module, respectively. The first power generation amount, the second power generation amount or the third power generation amount of each target photovoltaic module are added to the power generation amount of the target photovoltaic module in the first row to obtain a total power generation amount of the photovoltaic module array. Due to the presence of three different tracking angle adjustment mode, the tracking angles of the target photovoltaic modules other than that in the first row, namely (n−1) target photovoltaic modules, are desired to be adjusted. Therefore, $3^{(n-1)}$ sets of total power generation amount data can be calculated for the photovoltaic module array. As an example, if n=4, the tracking angles of 3 target photovoltaic modules other than the first row are desired to be adjusted in the first adjustment mode, the second adjustment mode and the third adjustment mode respectively, resulting in $3^3$ optimized combinations of adjustment modes and thus $3^3$ sets of total power generation amount data.

Three different tracking angle adjustment mode are adopted to iteratively optimize the respective target photovoltaic modules in the photovoltaic module array. On the basis of the micro-shading model, the optimized power generation amount of each target photovoltaic module and the total power generation amount of the whole photovoltaic module array are calculated, which can facilitate optimization of the total power generation amount of the photovoltaic module array.

Figure 13:
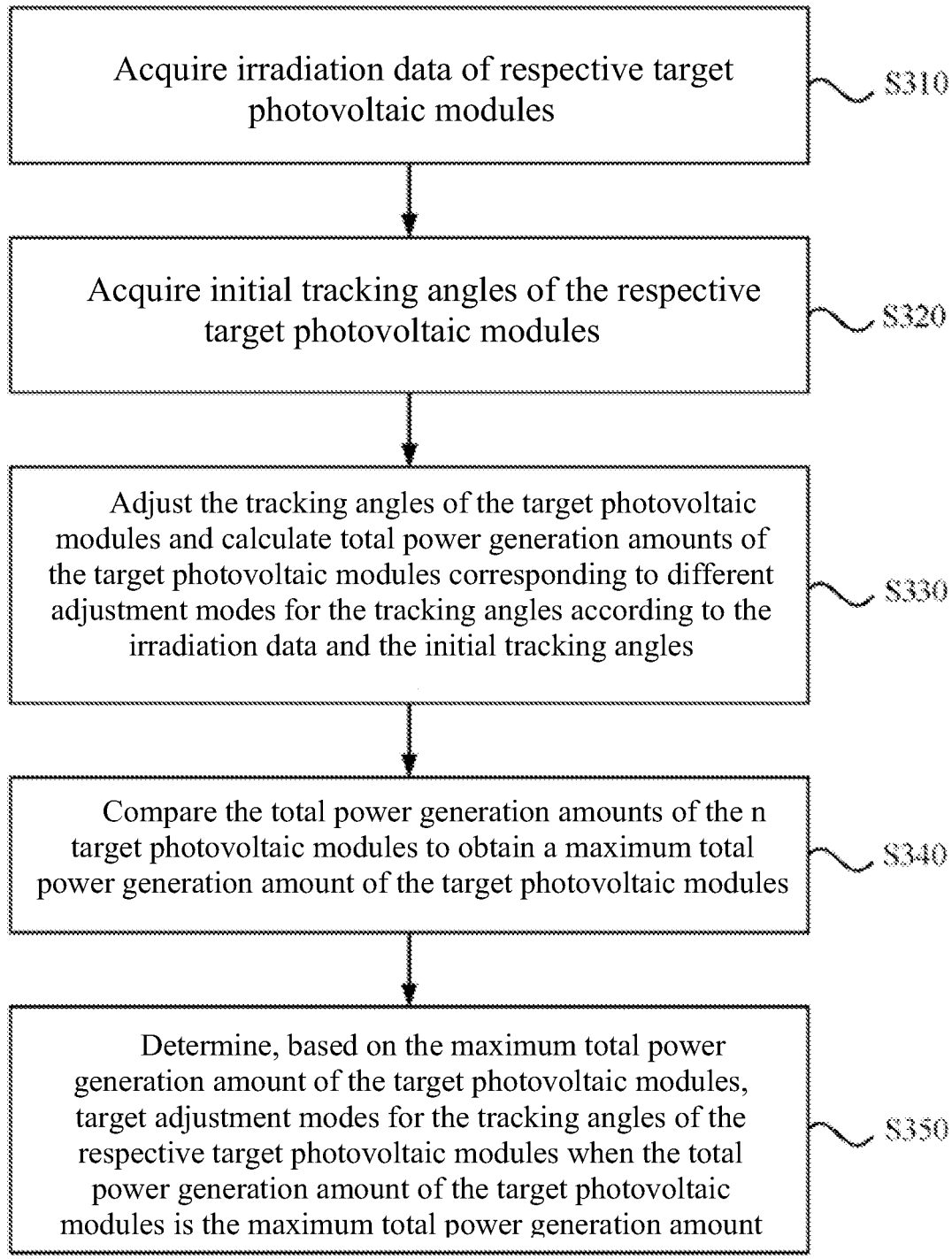
FIG. 13 is a flowchart of yet another tracker tracking method according to an embodiment of the present disclosure.

Optionally, FIG. 13 is a flowchart of yet another tracker tracking method according to an embodiment of the present disclosure. As shown in FIG. 13, on the basis of the above embodiments, the tracker tracking method includes the following steps S310 to S350.

At S310, acquiring irradiation data of respective target photovoltaic modules.

At S320, acquiring initial tracking angles of the respective target photovoltaic modules.

At S330, adjusting tracking angles of the target photovoltaic modules and calculating total power generation amounts of the target photovoltaic modules corresponding to different adjustment modes for the tracking angles according to the irradiation data and the initial tracking angles.

At S340, comparing the total power generation amounts of the n target photovoltaic modules to obtain a maximum total power generation amount of the target photovoltaic modules.

Specifically, $3^{(n-1)}$ sets of total power generation amount data of n target photovoltaic modules are calculated based on the micro-shading model and then compared, and so that a maximum total power generation amount of the photovoltaic module array can be selected.

At S350, determining, based on the maximum total power generation amount of the target photovoltaic modules, target adjustment modes for the tracking angles of the respective target photovoltaic modules when the total power generation amount of the target photovoltaic modules is the maximum total power generation amount.

Specifically, selecting the optimized combination of tracking angle adjustment modes corresponding to the maximum total power generation amount of the photovoltaic module array, and identifying the adjustment modes for the tracking angles of the respective target photovoltaic modules in the optimized combination as the target adjustment modes, respectively.

As an example, a photovoltaic module array arranged in Tongchuan area of China with 4 (rows of) target photovoltaic modules, that is, n=4, is taken as an example for illustration. At the true solar time 6:20 on summer solstice in Tongchuan area of China, the horizontal total irradiation is 400 W/m², and the scattering irradiation is 100 W/m², so the photovoltaic module array has $3^{(n-1)}$, namely $3^{(4-1)}$ optimized combinations of adjustment modes for the tracking angles. Table 2 is a table of power generation amounts of target photovoltaic modules in different rows corresponding to different optimized combinations of adjustment modes provided in the embodiments of the present disclosure.

As can be seen from table 2, the maximum total power generation amount of the photovoltaic module array is obtained from the optimized combination 11 of tracking angle adjustment modes. Therefore, for a photovoltaic module arrangement point in Tongchuan area of China, in the case of a photovoltaic module array having 4 rows of target photovoltaic modules, the 1st row does not need to be adjusted, the 2nd row adopts the second adjustment mode, the 3rd row adopts the first adjustment mode, and the 4th row adopts the second adjustment mode. Adjusting the tracking angles of the tracking trackers respectively in this manner, so that the optimal power generation amount of the photovoltaic module array can be obtained.

TABLE 2

Power generation amounts of target photovoltaic modules after being optimized in different adjustment modes

| | Optimization mode | | | | Power generation output (W*min/m2) | | | | |
|---|---|---|---|---|---|---|---|---|---|
| No. | 1st row | 2nd row | 3rd row | 4th row | 1st row | 2nd row | 3rd row | 4th row | Total |
| 1 | \ | 1 | 1 | 1 | 851 | 325 | 1002 | 325 | 2503 |
| 2 | \ | 1 | 1 | 2 | 851 | 325 | 1002 | 524 | 2702 |
| 3 | \ | 1 | 1 | 3 | 851 | 325 | 1002 | 627 | 2805 |
| 4 | \ | 1 | 2 | 1 | 851 | 325 | 1002 | 325 | 2503 |
| 5 | \ | 1 | 2 | 2 | 851 | 325 | 1002 | 524 | 2702 |
| 6 | \ | 1 | 2 | 3 | 851 | 325 | 1002 | 627 | 2805 |
| 7 | \ | 1 | 3 | 1 | 851 | 325 | 1002 | 325 | 2503 |
| 8 | \ | 1 | 3 | 2 | 851 | 325 | 1002 | 524 | 2702 |
| 9 | \ | 1 | 3 | 3 | 851 | 325 | 1002 | 627 | 2805 |
| 10 | \ | 2 | 1 | 1 | 851 | 524 | 886 | 502 | 2763 |
| 11 | \ | 2 | 1 | 2 | 851 | 524 | 886 | 712 | 2973 |
| 12 | \ | 2 | 1 | 3 | 851 | 524 | 886 | 627 | 2888 |
| 13 | \ | 2 | 2 | 1 | 851 | 524 | 783 | 325 | 2483 |
| 14 | \ | 2 | 2 | 2 | 851 | 524 | 783 | 524 | 2682 |
| 15 | \ | 2 | 2 | 3 | 851 | 524 | 783 | 627 | 2785 |
| 16 | \ | 2 | 3 | 1 | 851 | 524 | 783 | 325 | 2483 |
| 17 | \ | 2 | 3 | 2 | 851 | 524 | 783 | 524 | 2682 |
| 18 | \ | 2 | 3 | 3 | 851 | 524 | 783 | 627 | 2785 |
| 19 | \ | 3 | 1 | 1 | 851 | 627 | 535 | 851 | 2864 |
| 20 | \ | 3 | 1 | 2 | 851 | 627 | 535 | 783 | 2796 |
| 21 | \ | 3 | 1 | 3 | 851 | 627 | 535 | 783 | 2796 |
| 22 | \ | 3 | 2 | 1 | 851 | 627 | 771 | 400 | 2649 |
| 23 | \ | 3 | 2 | 2 | 851 | 627 | 771 | 558 | 2806 |
| 24 | \ | 3 | 2 | 3 | 851 | 627 | 771 | 627 | 2876 |
| 25 | \ | 3 | 3 | 1 | 851 | 627 | 627 | 325 | 2430 |
| 26 | \ | 3 | 3 | 2 | 851 | 627 | 627 | 524 | 2629 |
| 27 | \ | 3 | 3 | 3 | 851 | 627 | 627 | 627 | 2732 |

Figure 14:
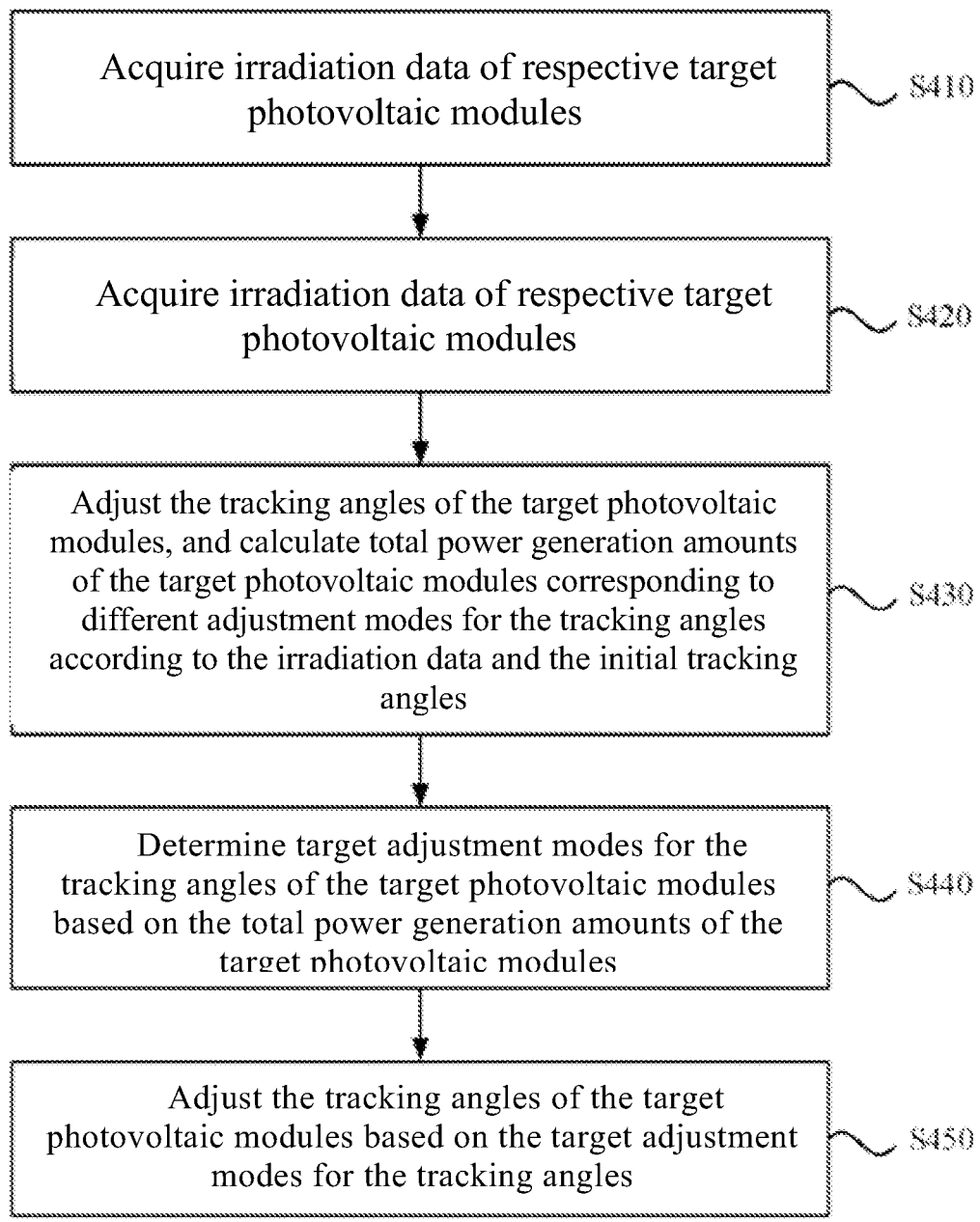
FIG. 14 is a flowchart of still another tracker tracking method according to an embodiment of the present disclosure.

Optionally, FIG. 14 is a flowchart of still another tracker tracking method according to an embodiment of the present disclosure. As shown in FIG. 14, on the basis of the above embodiments, the tracker tracking method includes the following steps S410 to S450.

At S410, acquiring irradiation data of respective target photovoltaic modules.

At S420, acquiring initial tracking angles of the respective target photovoltaic modules.

At S430, adjusting tracking angles of the target photovoltaic modules and calculating total power generation amounts of the target photovoltaic modules corresponding to different adjustment modes for the tracking angles according to the irradiation data and the initial tracking angles.

At S440, determining target adjustment modes for the tracking angles of the target photovoltaic modules based on the total power generation amounts of the target photovoltaic modules.

At S450, adjusting the tracking angles of the target photovoltaic modules based on the target adjustment modes for the tracking angles.

Specifically, on the basis of the micro-shading model, total power generation amounts of $3^{(n-1)}$ optimized combinations of a photovoltaic module array having n target photovoltaic modules after being iteratively optimized in the first adjustment mode, the second adjustment mode and the third adjustment mode may be calculated and compared to obtain one optimized combination with the optimal total power generation amount, and the tracking angle adjustment modes of the respective target photovoltaic modules in the optimized combination are determined as the target adjustment modes. According to the target adjustment modes, the controller controls the respective target photovoltaic modules to be adjusted to the tracking angles corresponding to the target adjustment modes, so that the optimal total power generation amount of the photovoltaic module array is obtained, and the influence of light shading or light leakage occurring in the reverse tracking stage on the power generation amount of the photovoltaic module array is effectively reduced.

Figure 15:
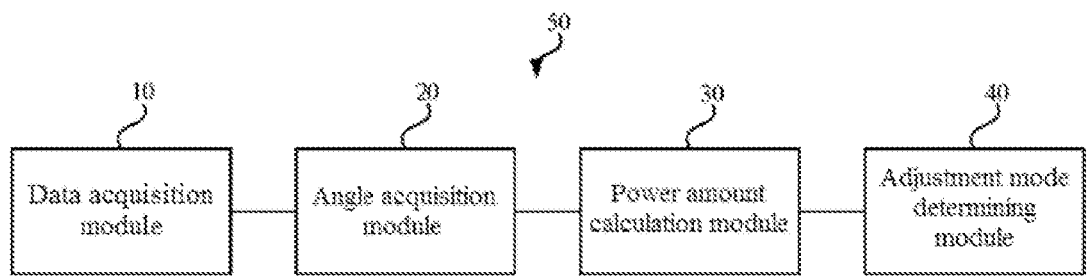
FIG. 15 is a block diagram of a tracker tracking system according to an embodiment of the present disclosure.

An embodiment of the present disclosure further provides a tracker tracking system. FIG. 15 is a block diagram of a tracker tracking system according to an embodiment of the present disclosure. As shown in FIG. 15, the tracker tracking system 50 includes:

- a data acquisition module 10 configured to acquire irradiation data of respective target photovoltaic modules;
- an angle acquisition module 20 configured to acquire initial tracking angles of the respective target photovoltaic modules;
- a power amount calculation module 30 configured to adjust tracking angles of the target photovoltaic modules and calculate total power generation amounts of the target photovoltaic modules corresponding to different adjustment modes for the tracking angles according to the irradiation data and the initial tracking angles; and
- an adjustment mode determining module 40 configured to determine target adjustment modes for the tracking angles of the target photovoltaic modules based on the total power generation amounts of the target photovoltaic modules.

The tracker tracking system provided in the embodiments of the present disclosure can execute the tracker tracking method according to any embodiment of the present disclosure, and has corresponding functional modules and beneficial effects of the execution method.

Optionally, on the basis of the above embodiments, the power amount calculation module 30 includes:

- a model establishing unit configured to establish a micro-shading model for the target photovoltaic modules according to the irradiation data of the respective target photovoltaic modules, the initial tracking angles of the respective target photovoltaic modules and a type of the target photovoltaic modules; and
- a tracking angle adjusting unit configured to adjust the tracking angles of the target photovoltaic modules based on the micro-shading model and according to the adjustment modes corresponding to the respective target photovoltaic modules.

Optionally, on the basis of the above embodiments, the tracking angle adjusting unit 32 includes:

- a tracking angle first adjusting subunit configured to, in the first adjustment mode of each target photovoltaic module, reduce the tracking angle of the target photovoltaic module based on the micro-shading model, with the shaded area of the target photovoltaic module being zero;
- a tracking angle second adjusting subunit configured to, in the second adjustment mode of each target photovoltaic module, increase the tracking angle of the target photovoltaic module based on the micro-shading model without raising the gear of the photovoltaic module; and
- a tracking angle third adjusting subunit configured to, in the third adjustment mode of each target photovoltaic module, reduce the tracking angle of the target photovoltaic module and lower the gear of the photovoltaic module based on the micro-shading model, with the shaded area being greater than zero.

Optionally, on the basis of the above embodiments, the tracking angle adjusting unit 32 further includes:

- a first power generation amount calculation subunit configured to calculate, based on the micro-shading model and according to the irradiation data and the initial tracking angles, a first power generation amount of each target photovoltaic module in the first adjustment mode;
- a second power generation amount calculation subunit configured to calculate, based on the micro-shading model and according to the irradiation data and the initial tracking angles, a second power generation amount of each target photovoltaic module in the second adjustment mode;
- a third power generation amount calculation subunit configured to calculate, based on the micro-shading model and according to the irradiation data and the initial tracking angles, a third power generation amount of each target photovoltaic module in the third adjustment mode;
- a total power generation amount calculation subunit configured to calculate total power generation amounts of n target photovoltaic modules based on the first power generation amount, the second power generation amount and the third power generation amount corresponding to the adjustment modes of (n−1) target photovoltaic modules and the power generation amount of the target photovoltaic module in the first row.

Figure 16:
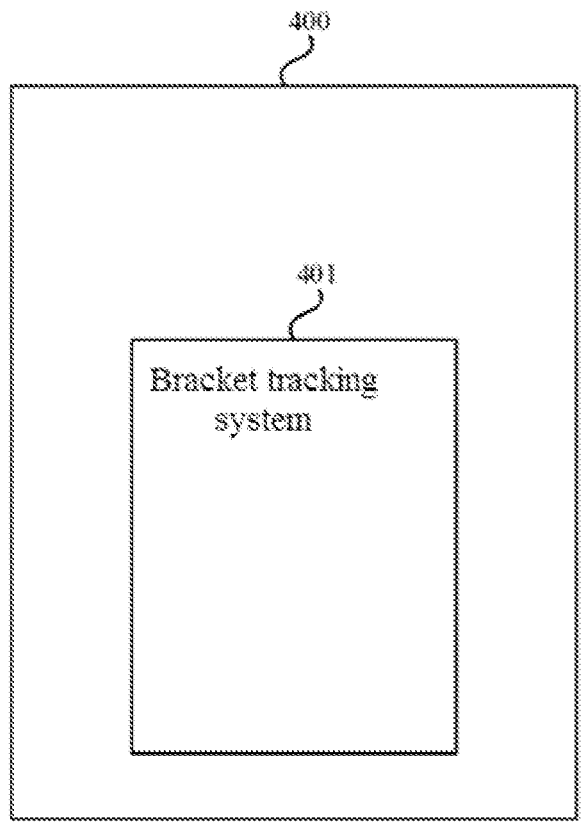
FIG. 16 is a schematic diagram of a photovoltaic apparatus according to an embodiment of the present disclosure.

An embodiment of the present disclosure further provides a photovoltaic apparatus. FIG. 16 is a schematic diagram of a photovoltaic apparatus according to an embodiment of the present disclosure. As shown in FIG. 16, the photovoltaic apparatus 400 includes the tracker tracking system 401 according to the above embodiments, which can implement the tracker tracking method according to the above embodiments and has the same beneficial effects as the tracker tracking method.

Figure 17:
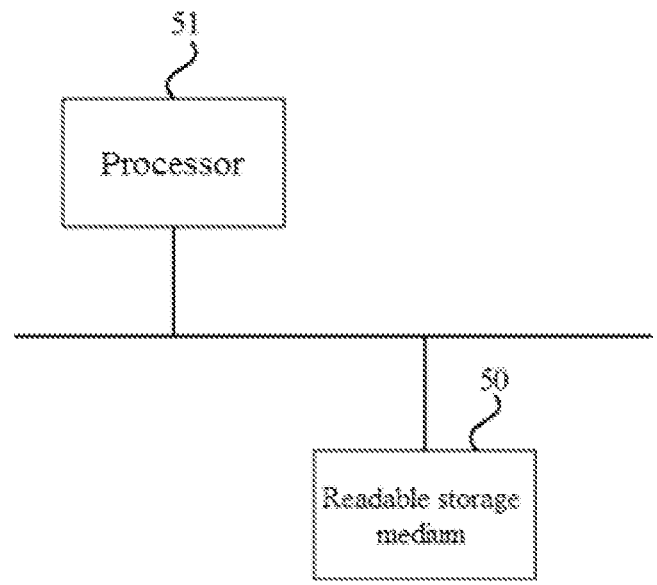
FIG. 17 is a block diagram of a readable storage medium according to an embodiment of the present disclosure.

The present disclosure further provides a readable storage medium 50 containing computer-executable instructions. FIG. 17 is a block diagram of a readable storage medium according to an embodiment of the present disclosure. The computer executable instructions, when executed by a computer processor 51, implement a tracker tracking method including: acquiring irradiation data of respective target photovoltaic modules; acquiring initial tracking angles of the respective target photovoltaic modules; adjusting the tracking angles of the target photovoltaic modules, and calculating total power generation amounts of the target photovoltaic modules corresponding to different adjustment modes for the tracking angles according to the irradiation data and the initial tracking angles; and determining target adjustment modes for the tracking angles of the target photovoltaic modules based on the total power generation amounts of the target photovoltaic modules.

Obviously, for the storage medium containing computer-executable instructions provided in the embodiments of the present disclosure, the computer executable instructions are not limited to the operations of the method as described above, but can also be used for implementing operations related to the tracker tracking method according to any embodiment of the present disclosure.

Through the description of the above implementations, those skilled in the art can clearly understand that the present disclosure may be implemented by means of software plus necessary general hardware. Obviously, it may also be implemented by hardware, but in most cases, the former is preferable. Based on such understanding, the technical solutions of the present disclosure essentially or, in other words, a part thereof contributing to the prior art, can be embodied in a form of a software product, where the software product may be stored in a computer readable storage medium, such as a computer floppy disk, a read-only memory (ROM), a random access memory (RAM), a flash, a hard disk, or an optical disk or the like, and includes several instructions to make a computer device (which may be a personal computer, a server, or a network device, etc.) to execute the methods according to various embodiments of the present disclosure.

It should be noted that, in the above embodiments of the tracker tracking system, the included units and modules are merely divided according to the functional logic, but are not limited to the above division, as long as the corresponding functions can be implemented; in addition, the specific names of the functional units are merely for the convenience of distinguishing from each other, and are not used for limiting the protection scope of the present disclosure.

It is to be noted that the foregoing is merely an illustration of the preferred embodiments and principles of the applied technology in the present disclosure. Those skilled in the art will appreciate that the present disclosure is not limited to the particular embodiments described herein, and that various obvious changes, rearrangements and substitutions will now be apparent to those skilled in the art without departing from the scope of the present disclosure. Therefore, although the present disclosure has been described in some detail by the above embodiments, the present disclosure is not limited to the above embodiments, and may include other equivalent embodiments without departing from the concept of the present disclosure, and the scope of the present disclosure is determined by the scope of the appended claims.

What is claimed is:

1. A tracker tracking method, characterized by comprising:
    acquiring irradiation data of respective target photovoltaic modules;
    acquiring initial tracking angles of the respective target photovoltaic modules;
    adjusting tracking angles of the target photovoltaic modules and calculating total power generation amounts of the target photovoltaic modules corresponding to different adjustment modes for the tracking angles according to the irradiation data and the initial tracking angles; and
    determining target adjustment modes for the tracking angles of the target photovoltaic modules based on the total power generation amounts of the target photovoltaic modules.

2. The method according to claim 1, characterized in that the irradiation data comprises a shaded area of the photovoltaic module, an incident angle of the photovoltaic module, and a gear of the photovoltaic module being shaded;
    wherein gears of the photovoltaic module are partitioned by regions each having the same loss in power generation amount caused by the shaded area of the target photovoltaic module and based on a type of the target photovoltaic module.

3. The method according to claim 1, characterized in that the adjusting the tracking angles of the target photovoltaic modules according to the irradiation data and the initial tracking angles comprises:
    establishing a micro-shading model for the target photovoltaic modules according to the irradiation data of the respective target photovoltaic modules, the initial tracking angles of the respective target photovoltaic modules and a type of the target photovoltaic modules; and
    adjusting the tracking angles of the target photovoltaic modules based on the micro-shading model and according to the adjustment modes corresponding to the respective target photovoltaic modules; wherein the adjustment mode comprises: a first adjustment mode, a second adjustment mode and a third adjustment mode.

4. The method according to claim 3, characterized in that the adjusting the tracking angles of the target photovoltaic modules based on the micro-shading model and according to the adjustment modes corresponding to the respective target photovoltaic modules comprises:
    in the first adjustment mode of each target photovoltaic module, reducing the tracking angle of the target photovoltaic module based on the micro-shading model, with the shaded area of the target photovoltaic module being zero;
    in the second adjustment mode of each target photovoltaic module, increasing the tracking angle of the target photovoltaic module based on the micro-shading model without raising the gear of the photovoltaic module; and
    in the third adjustment mode of each target photovoltaic module, reducing the tracking angle of the target photovoltaic module and lowering the gear of the photovoltaic module based on the micro-shading model, with the shaded area being greater than zero.

5. The method according to claim 3, characterized in that the calculating the total power generation amounts of the target photovoltaic modules corresponding to different adjustment modes for the tracking angles according to the irradiation data and the initial tracking angles comprises:
    calculating, based on the micro-shading model and according to the irradiation data and the initial tracking angles, a first power generation amount of each target photovoltaic module in the first adjustment mode;
    calculating, based on the micro-shading model and according to the irradiation data and the initial tracking angles, a second power generation amount of each target photovoltaic module in the second adjustment mode;
    calculating, based on the micro-shading model and according to the irradiation data and the initial tracking angles, a third power generation amount of each target photovoltaic module in the third adjustment mode;
    calculating total power generation amounts of n target photovoltaic modules based on the first power generation amount, the second power generation amount and the third power generation amount corresponding to the adjustment modes of (n−1) target photovoltaic modules and the power generation amount of a single target photovoltaic module in a first row;
    wherein n is a positive integer greater than or equal to 2; and the adjustment modes of the (n−1) target photovoltaic modules comprises 3 (n−1) combinations.

6. The method according to claim 5, characterized in that the determining the target adjustment modes for the tracking angles of the target photovoltaic modules based on the total power generation amounts of the target photovoltaic modules comprises:

comparing the total power generation amounts of the n target photovoltaic modules to obtain a maximum total power generation amount of the target photovoltaic modules; and determining, based on the maximum total power generation amount of the target photovoltaic modules, the target adjustment modes for the tracking angles of the respective target photovoltaic modules when the total power generation amount of the target photovoltaic modules is the maximum total power generation amount.

7. The method according to claim 1, characterized in that after determining the target adjustment modes for the tracking angles of the target photovoltaic modules based on the total power generation amounts of the target photovoltaic modules, the method further comprises:

adjusting the tracking angles of the target photovoltaic modules based on the target adjustment modes for the tracking angles.

8. A readable storage medium having instructions stored thereon which, when executed by a processor of a tracker tracking system, enables the tracker tracking system to perform the tracker tracking method according to claim 1.

9. A tracker tracking system, characterized by comprising:
a data acquisition module configured to acquire irradiation data of respective target photovoltaic modules;
an angle acquisition module configured to acquire initial tracking angles of the respective target photovoltaic modules;
a power amount calculation module configured to adjust tracking angles of the target photovoltaic modules and calculate total power generation amounts of the target photovoltaic modules corresponding to different adjustment modes for the tracking angles according to the irradiation data and the initial tracking angles; and
an adjustment mode determining module configured to determine target adjustment modes for the tracking angles of the target photovoltaic modules based on the total power generation amounts of the target photovoltaic modules.

10. A photovoltaic apparatus, characterized by comprising: the tracker tracking system according to claim 9.

* * * * *